United States Patent [19]
Mokrytzki et al.

[11] 3,781,616
[45] Dec. 25, 1973

[54] INDUCTION MOTOR CONTROL SYSTEM

[75] Inventors: Boris Mokrytzki, Highland Heights; Peter W. Hammond, Chagrin, both of Ohio

[73] Assignee: Westinghouse Air Brake Company, Wilmerding, Pa.

[22] Filed: Oct. 13, 1971

[21] Appl. No.: 188,949

[52] U.S. Cl............... 318/230, 318/231, 318/318, 318/340, 318/388, 318/392, 318/404, 318/415
[51] Int. Cl. ........................................... H02p 1/30
[58] Field of Search.................. 318/230, 231, 308, 318/318, 336, 340, 388, 392, 393, 404, 415, 416

[56] References Cited
UNITED STATES PATENTS
| | | | |
|---|---|---|---|
| 3,477,002 | 11/1969 | Campbell | 318/230 X |
| 2,663,834 | 12/1953 | Large et al | 318/416 X |
| 3,584,276 | 6/1971 | Ringland et al | 318/231 X |

FOREIGN PATENTS OR APPLICATIONS
| | | | |
|---|---|---|---|
| 1,160,939 | 8/1969 | Great Britain | 318/231 |

Primary Examiner—Gene Z. Rubinson
Attorney—R. W. McIntire, Jr. et al.

[57] ABSTRACT

This disclosure relates to a control system for dynamically reenergizing a rotating induction motor. A pair of inverters supply power to the windings of the induction motor through an inductive reactor. A tachometer senses the rotational speed of the rotor of the induction motor and applies a signal to a programmed logic circuit for pulse width modulating the power of the inverters over a constant torque range and for step wave shaping the power of the inverters over a constant horsepower range. In the event of a interruption of power, the reapplied power to the induction motor is reduced and the frequency of the reapplied power is readjusted at or near the actual synchronous speed of the induction motor so that little, if any, current surges occur upon reenergizing of the induction motor.

22 Claims, 5 Drawing Figures

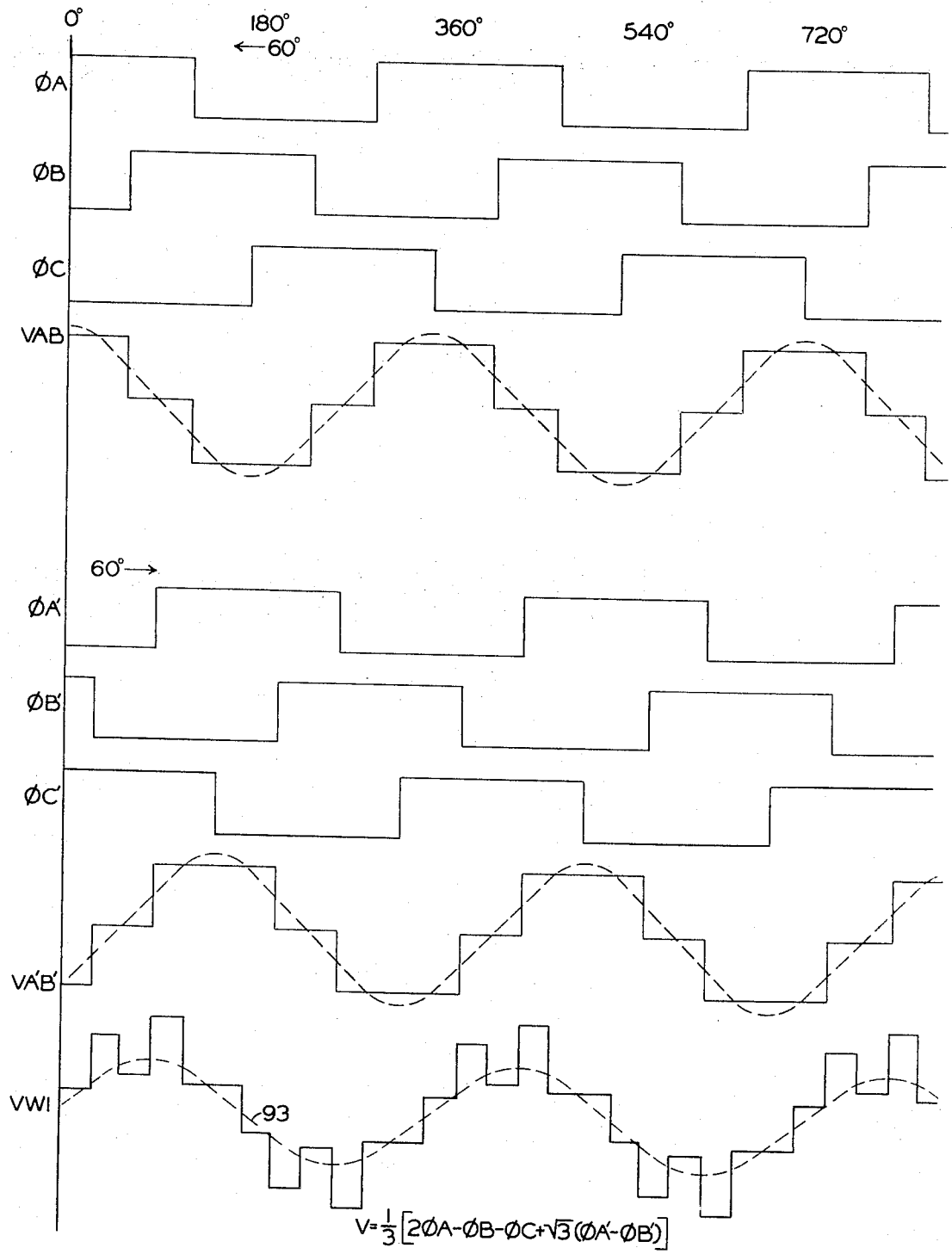

INDUCTION MOTOR CONTROL SYSTEM

This invention relates to a motor control system and, more particularly, to a system for reenergizing a rotating induction motor in motion by sensing the speed of the motor and by reapplying a lower than normal level of a.c. power having a frequency which is equal to the frequency representative of the synchronous speed of the motor at the time the power is reapplied to the motor.

In railroad and mass and/or rapid transit operations, it is common practice to employ electrical power as the source of energy. In certain installations, power in the form of d.c. voltage is carried by overhead lines or by a third rail which parallels the track rails. Normally, electrical pantographs or conductive shoes pick up the d.c. power from overhead or wayside conductors and apply it to the vehicle-carried equipment. Naturally, the power is used for illumunation, air-conditioning, heating controls and, of course, for the propulsion of the vehicles. The vehicles are propelled by electric motors which drive the wheels and move the vehicles along their routes of travel. It has been found advantageous to employ lightweight, high torque, highly efficient, and less costly a.c. induction motors to drive the vehicles. However, in d.c. propulsion territory, it is necessary to convert the d.c. voltage into an a.c. voltage for use by the motors. The conversion is accomplished by static inverters which transform the d.c. voltage into an a.c. voltage. In a three-phase dual-winding induction motor propulsion system, it is highly advantageous to utilize two bands of three-phase inverters. With a conventional pulse width modulation and six-step wave shape propulsion system it is possible to obtain torque-speed characteristics which are equal to that of a d.c. traction motor system but without the need of brushes and mechanical commutators. However, an induction motor propulsion system is capable of developing high transients or surges under certain conditions which could impair the operation of the system. For example, if the vehicle is in a running mode of operation and if another vehicle in the vicinity is suddenly brought to a stop, high voltage surges will be induced into the power supply of the running vehicle.

In order to prevent damage to the inverters, it is necessary to tripout or remove the power to the motor control system. The inverters are also incapable of withstanding high current surges without chance of damage or destruction and, therefore, a tripout or removal of power takes place. Other faults occur due to human failings which result in the loss of power or excitation to the induction motor. Now, if the stator of the propulsion motor retains any appreciable amount of residual magnetism at the time of the loss of power, the reapplication of full load power could result in very high current demands. That is, if the magnetic poles are at or near saturation and if the instantaneous value of the reapplied supply voltage is at or near its peak value, the load current could exceed eight to 10 times its normal level. When the frequency of the applied voltage does not match the frequency of the rotating propulsion motor when the system is reset after a loss of power, currents proportional to torques will also be drawn. It will be appreciated that the rotational speed of an induction motor is proportional to the frequency of the a.c. supply voltage. Thus, a supply voltage frequency which is higher or lower than the frequency of the rotating motor will unduly load the motor so that an additional amount of current will be drawn during an attempted restart. These high current surges are capable of interrupting the operation of the system in that the protective devices, such as, the fuses or circuit breakers are opened with the inevitable result of system shutdown. Previously, the moving vehicle had to be brought to a complete stop before restarting when a loss of motor excitation occurred in order to ensure that the propulsion system would not be disabled. It will be appreciated that if the vehicle is required to be stopped each time a loss of excitation through fault occurs, the resulting service and efficiency of the transportation system is greatly reduced. Thus, the advantages of an induction motor propulsion system can not be effectively realized unless the problems of the occurrence of loss of excitation faults can be resolved.

Accordingly, it is an object of this invention to provide an induction motor control system which need not be brought to zero speed for resetting.

Another object of this invention is to provide an induction motor propulsion system which is capable of being restarted in motion without incurring the possibility of system shutdown.

A further object of this invention is to provide an a.c. motor control circuit which prevents the generation of high current surges when the rotating motor is restarted by reducing the level of the voltage and adjusting the frequency of the reapplied voltage to the frequency of the rotating motor in order to prevent the appearance of high surge currents.

An additional object of this invention is to provide a control system whereby a rotating induction motor may be safely restarted in motion by reducing the normal level of supply voltage and by making the frequency of the supply voltage equal to the frequency of the rotating motor when the supply voltage is reapplied to the rotating motor.

Still another object of this invention is to provide a motor control system employing a variable frequency and voltage inverter circuit for supplying an a.c. induction motor.

Still a further object of this invention is to provide an induction motor control circuit utilizing a three-phase static inverter having a variable frequency and voltage characteristics.

Still an additional object of this invention is to provide a control system for dynamically restarting a rotating induction motor.

Yet another object of this invention is to provide a control circuit having two variable three-phase inverters for controlling the amplitude of a voltage and the frequency of the voltage supplied to the windings of a squirrel-cage induction motor.

Yet a further object of this invention is to provide a control circuit having a d.c. supply source, a pair of three-phase inverters, a speed responsive device and a logic circuit for dynamically restarting an induction motor by reapplying a lower than normal level of a.c. power having a frequency which is equal to the frequency representative of the speed of the rotor of the induction motor at the time that the power is reapplied to the induction motor.

Yet an additional object of this invention is to provide a motor reset control circuit reliable in operation, durable in use and efficient in service.

In accordance with the invention, the control system utilizes polyphase inverters, an inductive reactor, a speed sensing device, and a programmed logic circuit for dynamically resetting or reenergizing a rotating induction motor. The induction motor includes a pair of three-phase wye connected stator windings and a squirrel-cage rotor. The inductive reactor includes a plurality of main windings and a plurality of auxiliary windings which are connected to the various phases of the polyphase inverters and to the stator windings of the induction motor. The programmed logic controls the voltage as well as the frequency of the polyphase inverters in accordance with the speed of the induction motor rotor which is measured by speed sensing means and is applied to the programmed logic circuit. Upon normal startup, the induction motor operates as a constant torque device so that the voltage and frequency are varied by a pulse width modulation control network of the programmed logic in accordance with the speed of the motor until a base speed is reached. Thereafter, the induction motor operates as a constant horsepower device so that the voltage is held constant and only the frequency is varied by a six-step control network of the programmed logic in accordance with the speed of the motor. If a power loss occurs when the induction motor is running in the constant torque range, the voltage level is immediately reduced by the pulse width modulation control network and the speed sensing device causes the programmed logic circuits to ensure that the frequency of the voltage of the polyphase inverters is the same as the frequency of the induction motor at the time that power is reapplied to the motor. If a power loss occurs when the motor is running in the constant horesepower range, the voltage level is reduced by a phase angle control network in the logic and the frequency of the induction motor and the speed sensing device causes the programmed logic circuit to ensure the frequency of the voltage of the polyphase inverters is the same as the frequency of rotation of the induction motor at the time that power is reapplied to the motor.

Other objects, features and advantages of the present invention will become more apparent from the description of the preferred embodiment described with reference to the accompanying drawings forming a part of this specification, and in which:

FIG. 5 is a timing diagram illustrating a resultant voltage wave form which is produced by square waves which are shifted in a leading and lagging relationship with each other.

The present invention involves a system for starting and running an induction motor and for restarting or reenergizing the induction motor in motion after a power loss.

Figure 1:
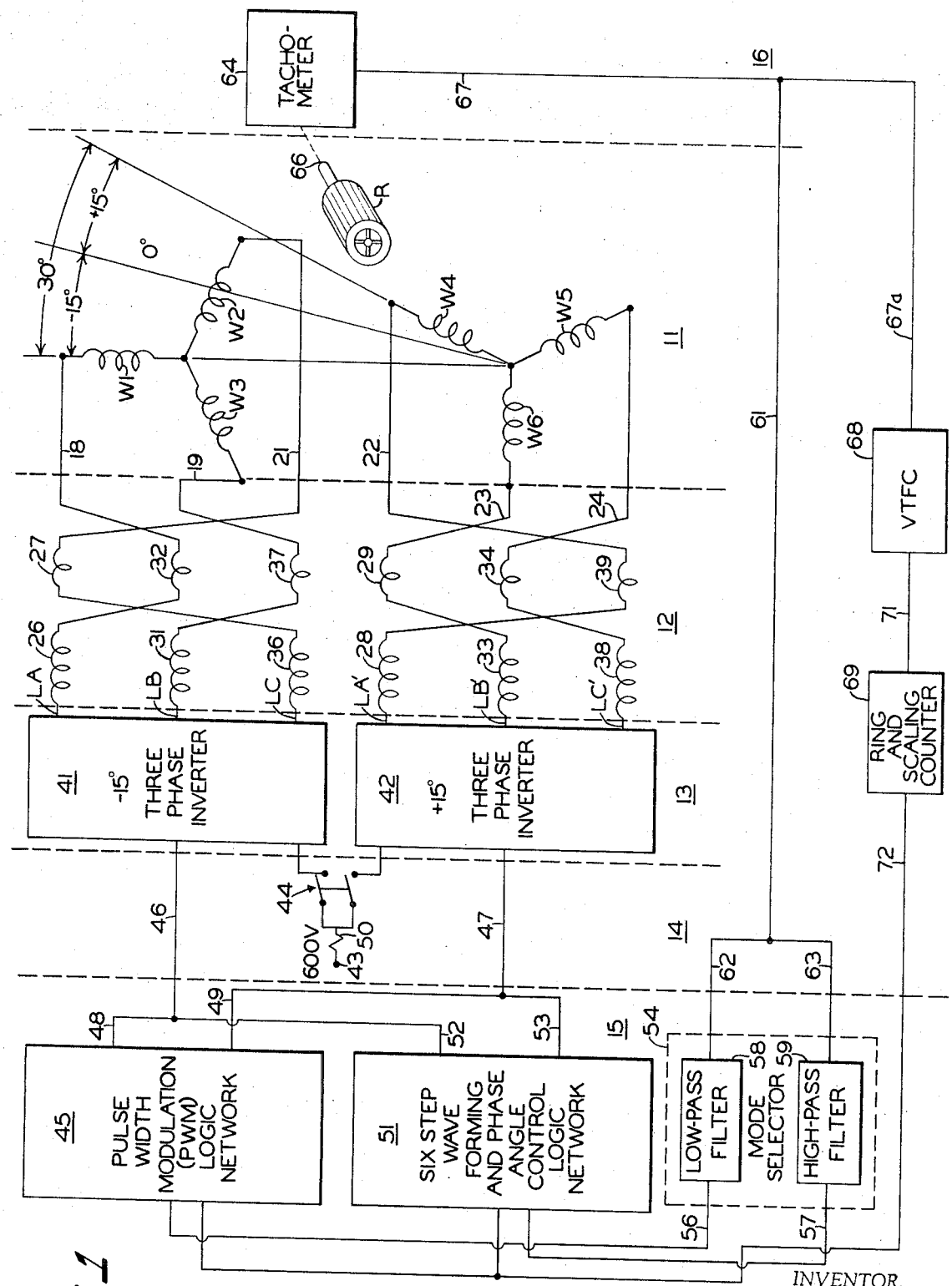
FIG. 1 is a schematic circuit diagram of a preferred embodiment of the invention.

Referring to the drawings, and in particular to FIG. 1, there is shown a motor control system including one of a plurality of polyphase induction type propulsion motors characterized by the numeral 11. The induction motor 11 includes a four-pole stator. A plurality of windings W1, W2, W3 and W4, W5, W6 are wye connected to form a two or dual phase arrangement. The motor 11 also includes a conventional cast aluminum squirrel-cage rotor R. It will be noted that the two sets of windings W1,W2,W3 and W4,W5,W6 are mechanically displaced by 30° as illustrated. The reason for this mechanical displacement is to match an inverter phase displacement to the motor and to remove or eliminate the effect of the fifth and seventh harmonics by a reactor section, as will be described hereinafter. The presence of these harmonics adversely affects the operation of the motor as they create excess heating of the motor. It should be recognized that the use of three-phase operation inherently removes the effect of the third harmonic which could also reduce motor operating efficiency.

It should also be recognized that the 30° mechanical displacement is important when considering motor operation from a power factor standpoint. This physical displacement which matches that of the inverters provides a balanced power factor in each of the inverters which enhances system operation in a manner that will be more readily appreciated from the description that follows hereinafter.

An inductive reactor 12 couples the output of a system of converters, such as, a pair of three-phase inverters 13 to the respective windings of the induction motor 11. A suitable d.c. power supply 14, such as 600 volt line voltage is taken from the wayside. As shown, the inductive reactor 12 includes a plurality of main and auxiliary windings. It will be appreciated that the main and auxiliary windings 26 and 27 as well as the main and auxiliary windings 28 and 29 are wound upon a common leg of the reactor's magnetic core (not shown). In a similar fashion, the other windings 31 and 32, 33 and 34 are wound on a separate leg of the reactor's core which also is not shown. In a like fashion, remaining windings 36 and 37, 38 and 39 are also wound upon a separate leg of the reactor's magnetic core. Auxiliary windings 32, 37, 27 are respectively connected to motor windings W1, W2, W3 by leads 18, 19, 21. In addition, auxiliary windings 39, 29, 34 are respectively connected to motor windings W4, W5, W6 by leads 22, 23, 24.

The functional operation and details of this reactor 12 are set forth in the copending application for Letters Patent of the United States, Ser. No. 187,974, filed Oct. 12, 1971, by Udo H. Meier, for Inverter Paralleled With Reactor. The operation of this reactor 12 and its cooperation with the induction motor 11 and the pair of inverters 13 will be more fully explained hereinafter.

The pair of three-phase inverters 13 are individually referenced by numerals 41 and 42. These inverters 41, 42 are of the type shown and described in Letters Patent Of the United States No. 3,207,974, issued Sept. 12, 1965 to W. McMurray, for Inverter Circuits. As mentioned above, the inverter circuits 41, 42 are connected to terminal 43 of a suitable d.c. supply source (not shown) by double-pole single-throw switch 44 which in actual practice may be a pushbutton type switch actuated by a motorman when it is desired to place the vehicle in service. Interposed between terminal 43 and switch 44 is a fuse 50, the function of which will be explained hereinafter.

It will be noted from the written designations on inverter circuits 41 and 42 that a ±15° phase displacement exists between the center of their respective three-phase outputs. Leads LA, LB, LC connected to main reactor windings 26, 31 and 36 constitute the output of inverter circuit 41, while leads LA', LB', LC' connected to main reactor windings 28, 33 and 38 constitute the output of inverter circuit 42. As previously mentioned, keeping inverter power factors equal requires that the firing time of inverter 41 by slightly delayed relative to the firing time of inverter 42. That is, in order to ensure that each of the two wye connected stator windings of induction motor 11 has equal power factors which is necessary for efficient operation, the 30° phase displacement is employed to offset the design characteristic created by the 30° mechanical displacement. Accordingly, the inverter 42 is designed to have a 15° lead on its output with respect to the motor reference angle and inverter 41 will have a 15° lag from the motor reference angle.

A careful study of the McMurray patent will readily reveal that patentee employs solid state devices in his inverter circuits. Thus inverters 41 and 42 which are incorporated in the presently described motor control system also preferably employ solid state circuitry. It will be noted that the inverter circuits normally utilize silicon controlled rectifiers or thyristors which are well known switching devices and therefore are not shown in this system illustration.

The thyristors or silicon controlled rectifiers are alternately rendered conductive in a selective fashion by gating pulses received from a programmed logic circuit 15 via multi-wave cable leads 46 and 47.

The programmed logic circuit 15 includes a pulse width modulation network 45 which feeds lead 46 via lead 48 and which also feeds lead 47 via lead 49. Leads 46 and 47 are symbolic only in that they represent combined six-step signals and modulated signals which are connected respectively to input gating circuits of the inverters 41 and 42. As will be described hereinafter, the pulse width modulation network 45 controls the inverters during a constant torque operation of the induction motor 11.

The programmed logic circuit 15 also includes a six-step wave forming and phase angle control network 51 which feeds inverter control leads 46 and 47 via leads 52 and 53, respectively. The six-step phase angle control logic network 51, to be described more fully hereinafter, is employed during a constant horsepower operation of the induction motor 11.

It will be seen that the programmed logic circuit 15 also includes a mode selector 54 connected respectively by leads 56, 57 to pulse width modulation network 45 and the six-step wave forming and phase angle control network 51. The mode selector includes a low pass filter 58 which is connected to lead 61, via lead 62 and a high pass filter 59 which is also connected to lead 61 via lead 63.

Alternatively, the inverter output mode of operation is determined by the absolute value of motor speed; thus if speed is low when a fault occurs requiring dynamic reset, the wave form of the inverter is the same that it would have under normal operation except that pulse width is drastically reduced. If the motor is in the high speed constant HP mode of operation and a fault occurs, voltage from the inverters individually is in the six-step mode and to control voltage we must phase shift each of the inverters away from the normal ±15° position to something like ±65° perhaps to reduce voltage drastically while maintaining frequency and the reference phase point specifically.

Lead 61 is connected to the speed sensing device 16 which, in the present instance, may take the form of a conventional commercially available tachometer 64. The tachometer 64 is connected to the shaft 66 of the rotor R of the induction motor 11. Thus, the frequency of the signals on output lead 67 of the tachometer 64 is a function of the rotational speed of the squirrel-cage rotor R. It will be appreciated that the speed of rotation of the rotor R is a function of the frequency of the motor supply voltage minus the frequency of the slip normally present in this type of motor. Thus, the tachometer 64 produces a signal frequency translatable to a reference which is indicative of the actual rotating frequency or speed of the rotor R. It should be noted that the lead 67 is also connected to a voltage-to-frequency converter 68 via lead 67a. The voltage-to-frequency converter 68 normally operates at a much higher frequency than the inverter fundamental frequency and is connected to a ring and scaling counter circuit 69 via lead 71. The ring and sealing counter 69 is connected by lead 72 to the pulse width modulation logic network 45 and to the six-step wave forming and phase angle control logic network 51. The appearance of an output on lead 72 to pulse width modulation logic network 45 and six-step wave forming and phase angle control logic network 51 will allow either of these networks to be enabled whenever there is also an input signal on either lead 56 or 57, respectively, from low pass filter 58 and high pass filter 59 of the mode selector 54.

Figure 2:
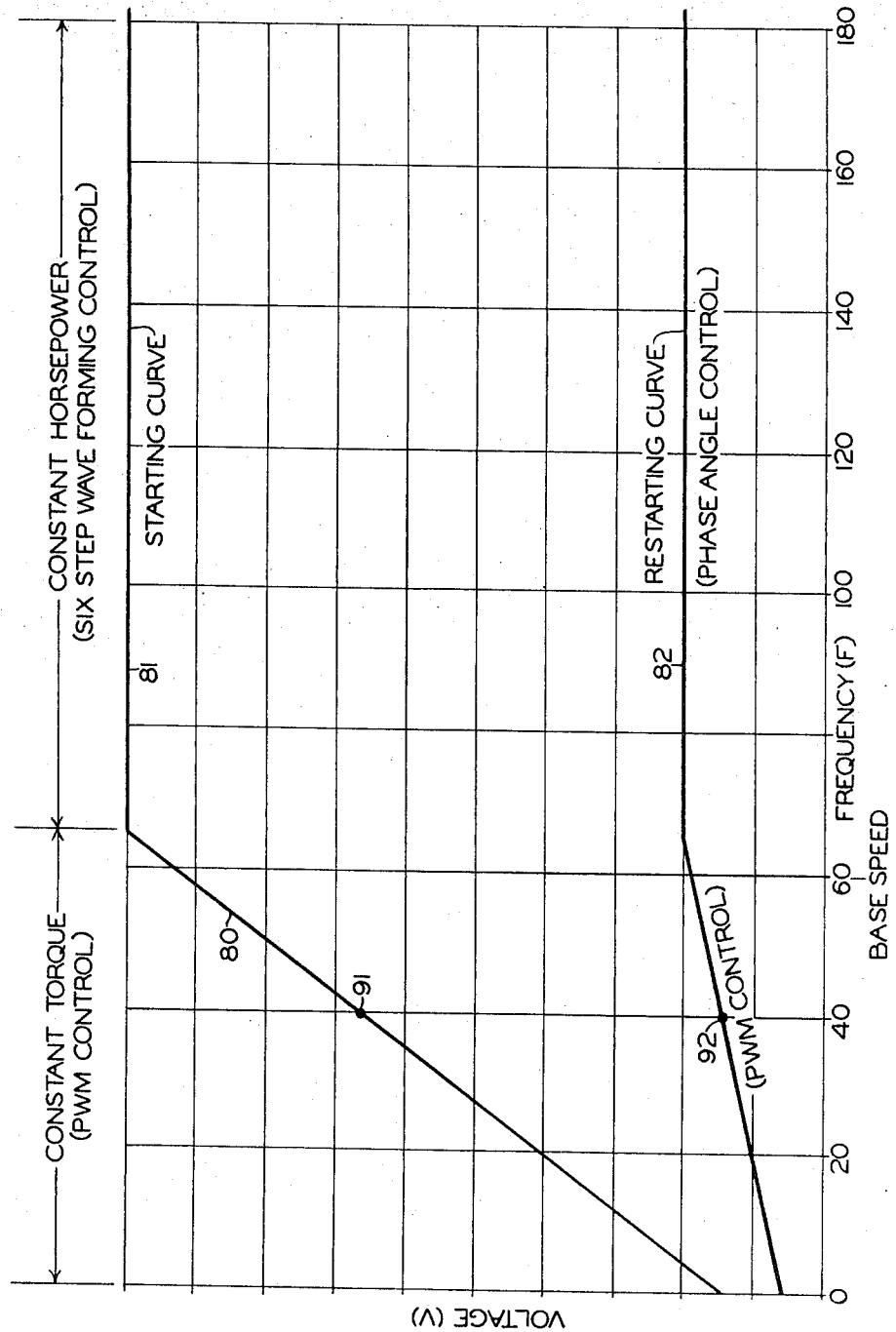
FIG. 2 illustrates the voltage versus the frequency characteristics for an induction motor in the fully excited and in the dynamic reset mode.

Reference is now made to FIG. 2 which illustrates the voltage versus the frequency characteristic requirement of a typical induction motor. It will be noted that the initial inclined portion 80 of the upper starting and running curve is representative of constant torque operation, that is, from zero to approximately 60 hertz the voltage is varied as well as the frequency of the supply voltage. The remaining portion 81 of the upper curve is representative of constant horsepower wherein the voltage is held substantially constant while the frequency of the motor supply voltage is steadily increased as the vehicle is accelerated. It has been found that voltage in the constant torque range of operation may be effectively controlled by the pulse width modulation technique afforded by logic network 45, while voltage reduction in the constant horsepower range may be effectively controlled by phase shifting the two inverter outputs away from the nominal ±15° point. Smooth and efficient operation follows so long as supply power is constantly connected to terminal 43. In actual practice the terminal 43 is connected to a pantograph (not shown) which picks off power from an overhead caternary (not shown) or is connected to a conductor shoe (not shown) which rides on a third rail (not shown) in an electrified supply system. In previous motor control systems, excessive current or voltage on the catenary or on the third rail causes a tripout device to interrupt the power to the motor by removing supply voltage from terminal 43. Power may also inadvertently be removed by the motorman if he actuates the stop button which opens the power supply to the inverters, and thus removes excitation from the motor. Hence, each of these faults causes deenergization of the system and a concomitant change in motor frequency, which frequency may be lower or higher than the normal power supply frequency dependent upon the load demands of the motor.

As mentioned above, let us assume that the motor 11 is employed for propelling a vehicle along a guide roadway, such as, a railway track. It will be seen that upon deenergization the rotational speed of the motor may increase dependent upon the grade of the trackway. If one attempts to restart the induction motor 11 at the voltage and frequency values which are present at the instant of loss of excitation, it is possible to cause system shutdown in that the protective devices, such as, the fuses or circuit breakers, will be blown by high current surges that may appear. In the instant embodiment of the invention one such fuse is designated by reference numeral 50. The fuse 50 protects the semiconductive devices of the inverters from being damaged or destroyed. The high current surges usually are produced by either one of two conditions. For example, if the remanent magnetic state of the stator poles is at or near the saturation level and if the instantaneous value of voltage is near or at its peak value coupled with the fact that its phase relationship is in the same relationship as that which existed prior to the loss of excitation, the effective impedance of the motor winding coils will be very low or substantially zero so that high load current demands result. Similarly, if the frequency of the reapplied voltage is different from the frequency of the rotating rotor, then the difference frequency simulates slip and therefore the motor will demand a high torque effort which may also result in large current surges. Thus, in order to alleviate the high current surges, it is necessary to effectively reduce the voltage level of the supply source and to change the frequency of the inverter voltage to correspond to the frequency which is representative of rotor speed at the time power is applied at restart. Such operation is represented by the lower curve 82 which is labeled as the restarting curve. It will be appreciated that by having the frequency tied in to motor synchronous speed the transient of getting the motor back into torque production is virtually eliminated.

NORMAL OPERATION

Let us assume that the system is energized by closure of the switch 44 by the motorman. It will be noted that no rotational movement will be imparted to the rotor until the inverter is turned on at minimum frequency voltage and the level of the motor current produces torque that exceeds the need of the system. It will be noted, as shown in FIG. 2, the voltage value and the frequency of motor voltage are linearly increased in accordance with curve 80 corresponding to full load on the motor. As previously mentioned, the lower response curve portion 80 is under control of the pulse width modulation control logic network 45. The pulse width modulation control logic network 45 includes conventional integrated circuits which form necessary logic circuits, such as, gates, matrixes, amplifiers, and the like. The details of the pulse width modulation circuit are not necessary for an understanding of the present invention since any skilled programmer given the necessary inputs could utilize Boolean algebra to formulate a software program which could be reduced to hardware circuits. Thus, any two given programmers could solve the problem by two entirely different software programs and hardware logic circuitry. It will be appreciated that the pulse width modulation network is enabled by signals appearing on leads 56 and 72. Thus, as the rotor begins turning and driving the tachometer 64, signals proportional to the speed of the rotor will appear on lead 67. Lead 61 applies the signals to the mode selector 54 and since the initial frequency is relatively low, namely, 60 hertz or under, they are passed by the low pass filter 58 so that an enabling control signal is delivered to the pulse width modulation logic 45. The logic circuit 45 provides a gating signal at select times to be delivered to the inputs of the inverter 41 over multiwire cables 46 and 48 and to the inverter 42 over multiwire cables 47 and 49. In actual practice, the lower portion of the starting curve 80 is divided into a discrete number of frequency ranges. That is, it has been found advantageous to decrease the notch rate of the pulse width modulations as the frequency is increased at select points along the curve 80 in order to provide a more even voltage gradient. That is, the gating signals produced by the pulse width modulation network 45 will have a variable notch rate and pulse width in accordance with the frequency of operation so that the inverters will vary the effective voltage appearing on the motor windings. A minor variation in effective voltage may be called for by the difference between heavy and light loading.

Figure 3:
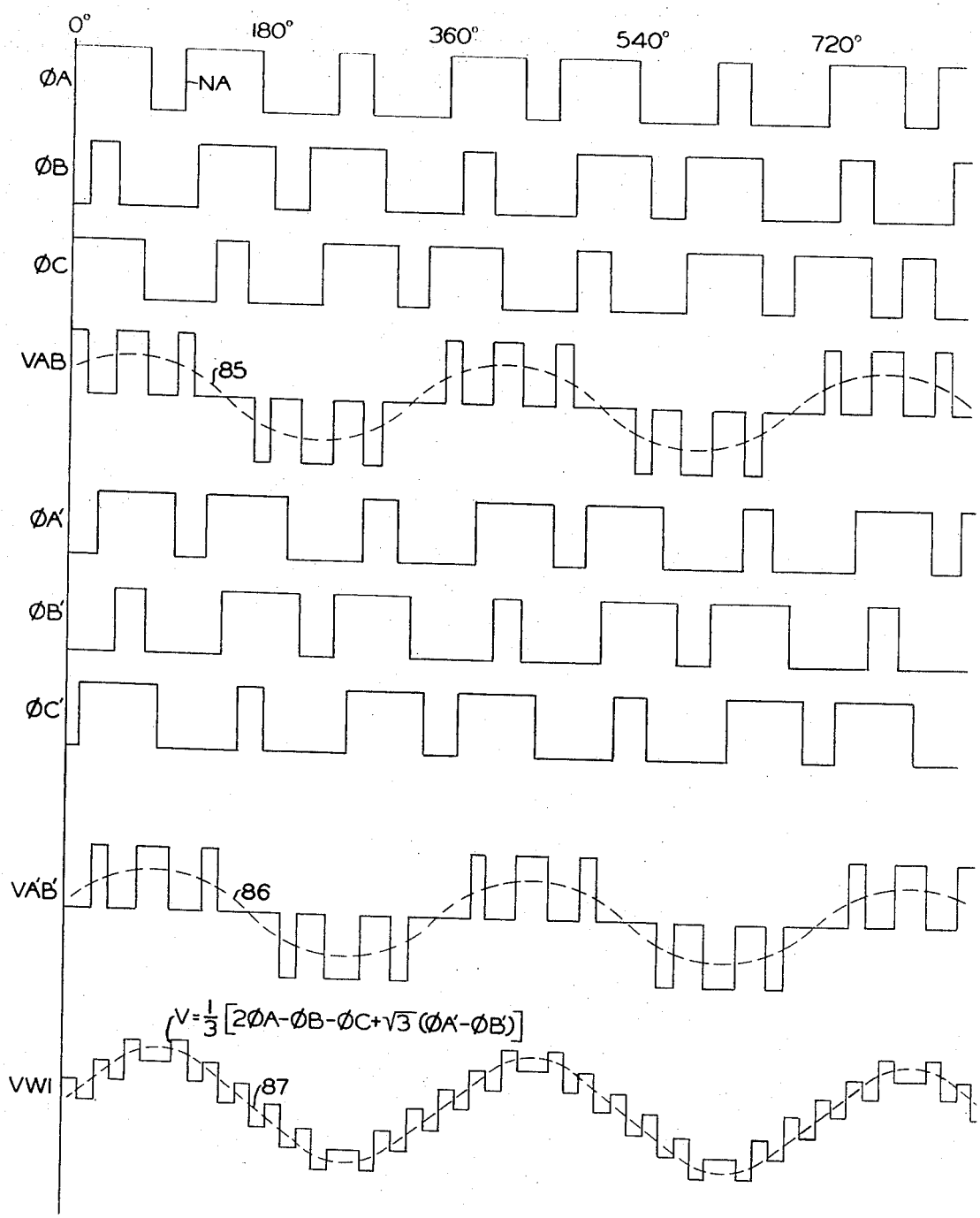
FIG. 3 is a timing diagram illustrating a resultant voltage wave form which is produced by notched square waves which are added in a given phase relationship.

Turning now to FIG. 3, which is illustrative of pulse width modulation, it will be seen that the voltages on $\phi A$, $\phi B$ and $\phi C$ are similarly shaped but shifted 120° apart, and these voltage wave forms are of the type which will appear on leads LA, LB and LC. It will be further understood that two thyristors are employed for each phase and that each thyristor would normally be turned "on" and "off" in the timing sequence depicted in FIG. 4. However, with pulse width modulation each thyristor is rendered nonconductive a number of times proportional to the notch rate, so that a series of output pulses are produced whose widths are proportional to the remainder of the wave with notches removed. The number of notches and the widths determine the number of voltage pulses that will appear on the output leads LA, LB and LC. In the example shown in FIG. 3, the single notch NA is approximately 30° wide so that an initial pulse of 75° and a final pulse of 75° will appear every half cycle. That is, lead LA will be at a 600 volt level for the initial 75° and will return to ground for 30° during the width of notch NA, and will then go to the 600 volt level for the remaining 75° of the half cycle. On the alternate half cycle, line LA will be grounded for the initial 75° and will go to the 600 volt level for the next 30°, which is the width of the notch NA, and will then go to ground for the subsequent 75°. The voltages on lines LB and LC undergo a similar transition except that they are 120° out of phase. Accordingly, the voltage appearing across lines LA and LB, namely, $V_{AB}$ (FIG. 3) is the sum of the voltage differences of phases $\phi A$ and $\phi B$. Note that the fundamental of the voltage $V_{AB}$ is a quasi sinusoidal wave 85 having a frequency equal to the frequency of the inverter and having an effective peak value which is proportional to the sum of the area under the $V_{AB}$ voltage curve. Thus, by decreasing the notch width and increasing the frequency of the inverter in proportion to the speed of the motor, the effective voltage to the first stator wye connected windings W1, W2, W3 is increased. In a similar fashion, the second stator wye connected windings W4, W5, W6 fed by inverter 42 are likewise controlled. However, the fundamental sinusoidal wave 86 of the voltage $V_{A'B'}$ is shifted ±15° about the reference angle on the motor to compensate for the mechanical displacement of the motor windings W4, W5 and W6, as earlier noted. The pulse width modulation operation will continue until the base speed of the motor is reached which has been selected to be at the 60 hertz frequency. At that time the pulse width modulation logic network 45 is disabled due to the lack of the signal on lead 56. That is, low pass filter 58 is unable to pass frequency signals higher than 60 hertz. However, the high pass filter 59 now passes the higher frequency signals produced by the tachometer 64 into lead 57. A signal on lead 57 enables the six-step wave forming network 51 so that the pair of three-phase inverters 41 and 42 are controlled by gating which now appears on leads 52, 46 and 53, 47, respectively.

Figure 4:
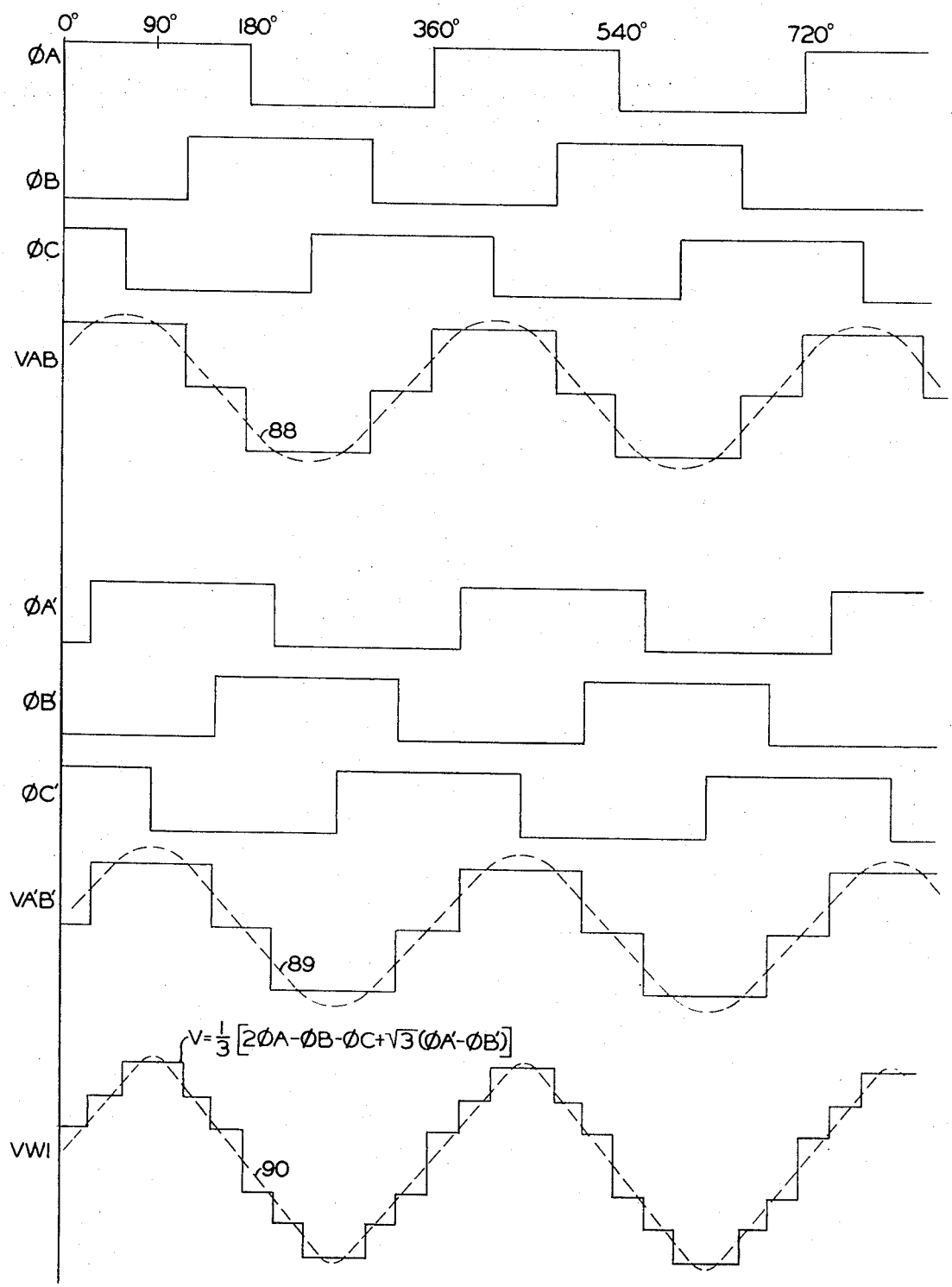
FIG. 4 is a timing diagram illustrating a resultant twelve-step voltage wave form which is applied to the stator windings of a dual wound a.c. induction motor.

Thus in viewing FIG. 2, it will be noted that at approximately 60 hertz the motor enters a constant horsepower mode of operation. It can be seen that the voltage will remain constant while the frequency varies in accordance with the speed of the rotor. In viewing FIG. 4, an analysis of the six-step operation will now be described in detail. As previously mentioned, the inverter thyristors are turned "on" and "off" every 180° by the logic circuit 51. Thus, the voltage on line LA is represented by curve $\phi A$, which shows the voltage at the full level of power supply for half a cycle and at ground level for the second half of the cycle. Similarly, curves $\phi B$ and $\phi C$ are rendered conductive and nonconductive on alternate half cycles. However, these latter voltages are respectively phase shifted 120°. In a like manner, the outputs $\phi A'$, $\phi B'$ and $\phi C'$ which appear on leads LA', LB' and LC' of the inverter 42, have similar wave characteristics except they appear 30° later than outputs $\phi A$, $\phi B$ and $\phi C$, respectively. It will be appreciated that the voltage across any given pair of inverter output lines is the sum of the voltage on the line. For example, output voltage $V_{AB}$, which is representative of the voltage across lines LA and LB, is the sum of the voltages $\phi A$ and $\phi B$, as shown in FIG. 4. Similarly, the voltage $V_{A'B'}$, as shown in FIG. 4, is the sum of the voltages $\phi A'$ and $\phi B'$. It will be noted that each of the voltages $V_{AB}$ and $V_{A'B'}$ takes the form of a six-step wave and has a frequency equal to the switching rate of the inverters 41 and 42. Thus, by varying the switching frequency of the inverters, the frequency of the fundamental 88, 89 as well as the resultant line-to-neutral voltage represented by curve 90 shown here in dotted fashion can be varied. The voltage wave VW1 follows the equation $$V = \frac{1}{3}[2\phi A - \phi B - \phi C + \sqrt{3}(\phi A' - \phi B')]$$

The other motor winding voltage follows a similar equation.

In order to more closely approximate the first harmonic fundamental wave, it has been found to be advantageous to transpose the six-step wave form into a twelve-step wave form. This is accomplished by the windings of the reactor 12 which parallel connect the inverters to the two three-phase wye connected stator windings of motor 11. It will be seen that the resultant fundamental wave form 90 shown superimposed on twelve-step wave form $V_{W1}$ is applied to winding W1. It should be noted that each of the windings of the motor is fed with similar voltages except that the phase angles remain in the same relationship as described above. It will be appreciated that, as the frequency is varied over the constant horsepower range, the peak value of fundamental voltage remains unchanged.

Thus, at the lower end of the running motor characteristic curve, the motor is operated as a constant torque device and therefore after the base speed point is reached the motor is operated as a constant horsepower device.

Returning now to a review of FIG. 3, it will be assumed that the motor is operating in the constant torque range and that a loss of excitation occurs due to a voltage surge on the line or the like. Let us assume that the motor is operating at the 40 hertz point on portion 80 of the running curve when the loss takes place. As previously mentioned, two conditions are required in order to prevent unduly high current surges from causing deleterious effects on the system. First it is necessary to reduce the voltage level as well as to readjust the frequency of the voltage in order to prevent high surge currents from being generated upon restart. Under the assumed condition the system is under control of the pulse width modulation logic network 45 so that at the time of the power loss, the network is programmed to the operation of the restarting curve as shown in FIG. 2. The interrupted power causes the pulse width modulation logic network 45 to control the level of voltage from point 91 to substantially point 92 so that the amplitude of the inverter voltages is dramatically reduced to a level which will ensure that high current curges will not be generated upon restart. This phenomena is accomplished by increasing the notch taken out of the wave form. If the notch wave form is of the type shown in FIG. 3, the width of the notch NA is increased a preselected amount. Obviously the increase in notched width results in an inherent reduction in the peak value of the fundamental voltage applied to the windings of motor 11. Two such fundamental voltage wave forms 85 and 86 are shown superimposed on voltages $V_{AB}$ and $V_{A'B'}$, respectively. The resultant fundamental wave form 87 is also reduced. It will be appreciated that the width of the notch or notches is dependent upon the range in which the motor is operating at the time of the occurrence of the loss of excitation. If there are numerous notches, each notch width need only be increased slightly to dramatically reduce the average value of voltage.

As mentioned, the notch rate varies over a range within the portion of the constant torque curve 80 so that in effect the notch rate of any particular range does not vary but simply the widths of the notches vary to allow for the effective peak value of the fundamental to be reduced to a level which will ensure that no surge currents are produced during peak value. Further, as mentioned above, it is mandatory that the frequency of the rotating rotor be measured at the time of reapplication of power so that no torque demand be required upon restart in order to prevent the generation of current surges. Thus, the tachometer 64 measures the speed of the rotor R and produces a signal indicative of the frequency of rotation which appears on leads 67, 61, 62; is passed by low pass filter 58 and lead 56 and effectively controls the pulse width modulation logic network 45, and in turn causes the frequency of switching of the inverters 41 and 42 to correspond with the frequency which is representative of the speed of the rotor R. This effectively ensures that no demand for torque will be initially required for restart operation in the constant torque range. After the initial reduction of the voltage applied to the windings of the motor 11, the voltage is rapidly raised to its normal value by quickly decreasing the width of notch NA as shown in FIG. 3. The motor assumes normal operation and follows the upper curve again if full torque is required and no further interruption is encountered.

Referring now to FIG. 5, which simulates the motor operating in the constant horsepower range, it will be appreciated that a failure occurring during this operation also requires that the voltage level be reduced and that the frequency of the rotating rotor be measured at the time of restart. Thus, if a failure occurs during constant horsepower operation, it is required that the system assume restart operation at a point along the restarting curve 82. That is, the voltage level must be reduced from full power to a substantially lower value as is represented by curve 82. This operation is accomplished by means of phase shifting the respective phase angles of the voltages of the inverter in relationship to each other. It has been found that a phase shift of approximately 150° will substantially reduce the winding voltage on the motor to a level which will prevent surge currents from being generated. For example, as shown in FIG. 5, a phase shift of only 60° dramatically reduces the peak voltage of the fundamental curve 93 that is applied to winding W1. Thus, upon occurrence of a loss of excitation, the sixth step wave form and phase angle control logic network 51 produce a signal which phase shifts the inverter 41 in one direction and phase shifts the inverter 42 in the opposite direction. As seen in FIG. 5, the phase shift about the motor reference accomplishes the necessary reduction in the amplitude of the voltage which is applied to the windings of the motor 11. As in the case of the constant torque operation the tachometer 64 measures the actual rotational speed of the rotor R and the tachometer 64 applies a frequency signal which is representative of the rotational speed of the motor. Thus, the step wave form and phase angle control logic network 52, in turn, controls the switching frequency of the inverters 41 and 42. Thus, no torque demand due to deviation of motor speed from synchronous speed of the motor 11 will take place upon restart. It will be understood that the reduction of the voltage is only momentary and upon reapplication of the power the six-step wave form and phase angle control logic network 51 will immediately take effect and rapidly increase the voltage to full value so that normal operation may be resumed.

Thus, when the presently described control system is employed in a railroad mass and/or rapid transit operation, little, if any, delay is incurred upon the reapplication of power after the occurrence of a loss of excitation. Thus, maximum service and operation are realized and a most efficient type of motor control function is produced.

While the invention has been described in relation to a transportation system, it will be appreciated that the control system may be utilized in other environments which utilize induction motors. Further, it is understood that while only a single motor has been illustrated, the control system is, in fact, capable of supplying power to a multitude of induction motors. Generally, a moving vehicle includes a drive motor on each axle of the vehicle and therefore a single control system to operate the motors in parallel.

It will be understood that other changes may be made to the presently described control system without departing from the spirit and scope of the invention and, therefore, these modifications, variations and alterations are meant to be covered by the subject matter of the annexed claims.

Having thus described our invention, what we claim is:

1. A control system for reenergizing a rotating induction motor comprising, a system of converters for supplying polyphase voltage to said induction motor, a speed sensing means for measuring the speed of said induction motor, and a programmed logic circuit means coupled to said converter system and responsive to said speed sensing means for causing the frequency of said polyphase voltage to substantially agree with the frequency which is representative of the synchronous speed of said induction motor at the time that said polyphase voltage is reapplied to said induction motor and reducing the amplitude of said polyphase voltage which is reapplied to said induction motor.

2. The control system as defined in claim 1, wherein said system of converters includes a pair of inverters one of which is phase shifted in one direction with respect to a reference point and the other of which is phase shifted in the other direction with respect to the reference point.

3. A control system for dynamically reenergizing a rotating induction motor comprising, a pair of three-phase inverters for supplying polyphase voltage to said induction motor through a reactor, a speed sensing means for measuring the speed of said induction motor, and a programmed logic circuit coupled to said pair of inverters and responsive to said speed sensing means for decreasing the amplitude of said polyphase voltage when an interruption occurs in the system and for readjusting the frequency of said polyphase voltage to the frequency which is representative of the synchronous speed of said induction motor at the time that said polyphase voltage is reapplied to said induction motor.

4. The control system as defined in claim 3, wherein said induction motor includes a pair of three-phase wye connected windings and a squirrel-cage rotor.

5. The control system as defined in claim 3, wherein said pair of three-phase inverters are phase shifted relative to each other in order to eliminate the fifth and seventh harmonics of the fundamental of said polyphase voltage.

6. The control system as defined in claim 3, wherein said reactor parallels said induction motor and said pair of three-phase inverters.

7. The control system as defined in claim 3, wherein said programmed logic circuit includes a pulse width modulation network for varying the amplitude of said polyphase voltage produced by said pair of three-phase inverters.

8. The control system as defined in claim 3, wherein said logic circuit includes a phase angle control network for varying the amplitude of said polyphase voltage produced by said pair of three-phase inverters.

9. The control system as defined in claim 3, wherein said induction motor includes a pair of three-phase wye connected windings which are mechanically displaced with respect to each other.

10. The control system as defined in claim 9, wherein said pair of three-phase inverters have outputs which are electrically shifted relative to each other.

11. The control system as defined in claim 10, wherein said mechanical displacement of said pair of wye connected windings is substantially equal to the electrical shift of said outputs of said pair of three-phase inverters.

12. The control system as defined in claim 3, wherein said induction motor includes a pair of three-phase windings which are parallel coupled to said pair of three-phase inverters by said reactor.

13. The control system as defined in claim 12, wherein said reactor includes a plurality of main windings and a plurality of auxiliary windings.

14. The control system as defined in claim 13, wherein said main winding of one phase is associated with an auxiliary winding of another phase.

15. The control system as defined in claim 3, wherein said programmed logic circuit includes a six-step wave form control network for varying the frequency of said polyphase voltage.

16. The control system as defined in claim 8, wherein said phase angle control network shifts the phase angle of the output of one of siad pair of three-phase inverters forward a given amount and shifts the phase angle of the output of the other one of said pair of three-phase inverters backward the same amount.

17. The control system as defined in claim 3, wherein said induction motor includes a first and a second wye connected winding arrangement which are parallel coupled to respective ones of said pair of polyphase inverters by said reactor which includes a multitude of windings.

18. A system for starting and running an induction motor and for reenergizing an induction motor in motion comprising, a d.c. voltage source, a pair of phase shifted inverters supplied by said d.c. voltage source, an inductive reactor coupling an output of said pair of phase shifted inverters to the stator windings of said induction motor, a tachometer driven by the rotor of said induction motor, a programmed logic circuit responsive to said tachometer for controlling the output of said pair of inverters so that said induction motor is operated as a constant torque device over a portion of its operating range and so that the induction motor is operated as a constant horespower device over the remaining portion of its operating range.

19. The system as defined in claim 18, wherein said induction motor includes a squirrel cage rotor.

20. The system as defined in claim 19, wherein said pair of inverters are connected in parallel with the dual three-phase wye connected windings by said inductive reactor.

21. The system as defined in claim 18, wherein said inductive reactor includes a plurality of main windings and a plurality of auxiliary windings one of which is intercoupled with one of said main windings.

22. A system comprising,
   a. a polyphase induction motor,
   b. a reactor,
   c. a polyphase inverter,
   d. a d.c. supply source,
   e. a logic circuit,
   f. a speed sensing means,
   said polyphase induction motor including a pair of mechanically displaced three-phase wye connected stator windings of main windings and a plurality of auxiliary windings connected to said stator windings, said polyphase inverter including a pair of electrically displaced three-phase switching sections connected to said main windings, said d.c. supply source providing power for said polyphase inverter, said logic circuit including a pulse width modulation section and a phase angle control section which are connected to said polyphase inverter, said speed sensing means measuring the speed of said squirrel cage rotor and causing said logic circuit to pulse width modulate the output of said inverter so that said polyphase induction motor initially runs as a constant torque device on startup and upon reaching a base speed said logic circuit causes the output of said inverter to produce a stepped wave voltage which thereafter allows said polyphase induction motor to run as a constant horsepower device, said speed sensing means controlling said logic circuit in a manner such that the amplitude of the output of said polyphase inverter is decreased and that the frequency of the output of said polyphase inverter is made to substantially correspond with the frequency of the synchronous speed of the rotating rotor of said polyphase induction motor.

* * * * *

UNITED STATES PATENT OFFICE
CERTIFICATE OF CORRECTION

Patent No. 3,781,616　　　　　　　　　Dated　December 25, 1973

Inventor(s) Boris Mokrytzki and Peter W. Hammond

It is certified that error appears in the above-identified patent and that said Letters Patent are hereby corrected as shown below:

Column 13, line 22, "siad" should be --said--

Column 14, line 19, after "windings", first occurrence, insert --and a squirrel cage rotor, said reactor including a plurality--

Signed and sealed this 23rd day of July 1974.

(SEAL)
Attest:

McCOY M. GIBSON, JR.　　　　　　　　C. MARSHALL DANN
Attesting Officer　　　　　　　　　　Commissioner of Patents